United States Patent
Linek et al.

(10) Patent No.: US 12,547,955 B2
(45) Date of Patent: Feb. 10, 2026

(54) ENTERPRISE RESOURCE PLANNING (ERP) CONFIGURATION MANAGER

(71) Applicant: AMB Consulting Inc, Hinckley, OH (US)

(72) Inventors: Mike Linek, Twinsburg, OH (US); Debbie Kobasic, Olmsted Falls, OH (US); Qaisar Bari, Hinckley, OH (US)

(73) Assignee: AMB Consulting Inc, Hinckley, OH (US)

( * ) Notice: Subject to any disclaimer, the term of this patent is extended or adjusted under 35 U.S.C. 154(b) by 526 days.

(21) Appl. No.: 17/856,475

(22) Filed: Jul. 1, 2022

(65) Prior Publication Data
US 2024/0005238 A1    Jan. 4, 2024

(51) Int. Cl.
G06Q 10/06    (2023.01)
G06Q 10/0631  (2023.01)
G06Q 10/0639  (2023.01)

(52) U.S. Cl.
CPC . *G06Q 10/06315* (2013.01); *G06Q 10/06395* (2013.01)

(58) Field of Classification Search
None
See application file for complete search history.

(56) References Cited

U.S. PATENT DOCUMENTS

| | | | |
|---|---|---|---|
| 2005/0102534 A1* | 5/2005 | Wong | G06F 21/577 726/4 |
| 2008/0216082 A1* | 9/2008 | Eilam | G06F 9/5072 718/104 |
| 2015/0370651 A1* | 12/2015 | Gaza | G06F 11/1464 707/652 |
| 2018/0131574 A1* | 5/2018 | Jacobs | H04L 43/0817 |
| 2019/0312793 A1* | 10/2019 | Hazen | H04L 41/5022 |

* cited by examiner

*Primary Examiner* — Alan Torrico-Lopez
(74) *Attorney, Agent, or Firm* — Eschweiler & Potashnik, LLC

(57) ABSTRACT

An enterprise resource planning (ERP) application or system is provided with an ERP configuration manager that manages segments of divisions of business-related activities across one or more legal entities and applications module components within different computing environments. Configuration items of the application module components can be selected or identified based on the segment, the one or more legal entities, or a phase of ERP implementation for different computing environments. Different computing environments, which may be modified, or different legal entities can be selected for analysis and an output provided in an implementation output that identifies variations in configurations of the configuration items across segments, the legal entities, or the computing environments.

20 Claims, 13 Drawing Sheets

Differences for Vendor payment method

— 600

Differences for Organization email template

— 602

— 604

| Type | Description | Legend | Example |
|---|---|---|---|
| Not Changed Field | There are no changes to the field between base and modified | White | For the last row below, Printing direction, Header, Unit, Interval and Aging indicator have not changed. |
| Changed Field | A field was changed from one setting in Base to another in Modified | --> | Blue | Line number has changed from 5.00 in Base to 3.50 in Modified. |
| New Row | A row that exists in Modified, but not in Base | +++ | Green | The configuration settings for Aging 30, 60, 90, 120 were added to Modified |
| Removed Row | A row that existed in Base, but does not exists in Modified | --- | Red | Credit Aging Period that existed in Base but does not exist in Modified. Those settings were removed. |
| Added or Removed Column | Added: A field that exists in Modified, but not Base Removed: A field that existed in Based, but does not exists in Modifield | +++ | Green (header) | This will happen when comparing across versions (i.e., 10.02.20 to 10.0.24). Dynamics will add, or make obsolete, a new field to a configuration item in a new version. |

FIG. 6

ISSUES

BASE

- Active Directory Security groups: Entity Configuration key not found;
- Aptean document dimension field setup: Entity not found;
- Catch weight tages: Entity configuration key not found;
- Consignment charge rule field setup: Entity not found

MODIFIED

- Active Directory Security groups: Entity Configuration key not found;
- Aptean document dimension field setup: Entity not found;
- Catch weight tages: Entity configuration key not found;
- Consignment charge rule field setup: Entity not found

FIG. 7

ENTERPRISE RESOURCE PLANNING (ERP) CONFIGURATION MANAGER

TECHNICAL FIELD

The subject application relates to an enterprise resource planning (ERP) application, and, in particular, to configuration management of the ERP.

BACKGROUND

Enterprise resource planning (ERP) applications and systems assist in the management of day-to-day business activities, including accounting, finance, procurement, project management, risk management, compliance, manufacturing, and supply chain operations. An ERP system includes performance management of a business organization to enable planning, budgeting, prediction, and reports associated with the organization's financial results. The ERP ties together multiple business processes to enable the flow of data between them, elimination of data duplications, data integrity, and the support of each aspect of business, including financial management, human resources, supply chain management, and manufacturing with accounting. Configuring various application module components can remain a challenge.

SUMMARY

The following presents a simplified summary in order to provide a basic understanding of some aspects disclosed herein. This summary is not an extensive overview. It is intended to neither identify key or critical elements, nor delineate the scope of the aspects disclosed. Its sole purpose is to present some concepts in a simplified form as a prelude to the more detailed description that is presented later.

In an aspect, a computing device, system, method or medium for an enterprise resource planning (ERP) application or system can operate an ERP configuration manager component via processing circuitry, processor component(s) and memory of an ERP configuration manager, to a select or identify one or more segments from among divisions of business-related activities in the ERP application, one or more legal entities, as well as one or more computing environments. The segments can include, for example, a financial service division (or segment), a human resources division, a manufacturing and supply chain division, a procurement division, a project management division, a retail and commerce division, a sales and marketing division, a base functionality division, or other segment of business/business-related activities that each include different application module components configured with configurations of configuration items specific to an associated segment of business-related activities of a company of business, business, corporation, or the like, referred to herein as a legal entity. As such, segments can include unique functions from among one another in the ERP application. Different business-related functions can be configured separately within each segment according to different application module components. One or more legal entities, as well as a phase of implementation of the ERP application can be identified, along with one or more segments of business or business-related activities. Configurations of configuration items that configure the application module components of the ERP application across different legal entities within the segment and different computing environments can be determined and selected for analysis and extraction of data by a user of the ERP application to generate an implementation output. A known state of one or more computing environments can be configured, which can include the configurations of the configuration items for particular application module components. A selection can be received and processed that includes at least two of: different computing environments, different segments, or the different legal entities. The configuration items can be further analyzed across the different computing environments, the segments, or the legal entities to generate a communication of results in the implementation output based on the selection.

In another aspect, a computing device, system, method or medium for an enterprise resource planning (ERP) application or system can operate an ERP configuration manager component via processing circuitry, processor component(s) and memory, to determine different legal entities or businesses and generate different computing environments associated with the selected legal entities, as well as configurations for configuration items associated with application module components. The configurations configure the application module components to perform business-related functions within a plurality of segments from among divisions of business-related activities in the ERP application. A first selection is determined and processed that includes at least one of: a first legal entity among various legal entities, a first segment from among various segments, or a first computing environment from among various computing environments. Additionally, a second selection is determined and processed that includes at least one of: a second legal entity from among legal entities, a second segment from among segments of business, or a second computing environment from among various computing environments. A subset of configurations of the configurations across at least two of: the first computing environment, the second computing environment, the first legal entity, the second legal entity, the first segment, or the second segment are extracted based on the first selection and the second selection. An implementation output is generated that comprises a number of similar configurations and a number of different configurations from among configuration items of application module components based on a mapping of the subset of configurations associated with the first and second selection.

In yet another aspect, a computing device, system, method or medium for an enterprise resource planning (ERP) application or system can operate for an ERP configuration manager component via processing circuitry, processor component(s) and memory, to identify a segment of a plurality of segments comprising divisions of business-related activities in the ERP application, a plurality of legal entities associated with the segment, and application module components within different computing environments. One or more configurations of configuration items are configured to configure the application module components in the ERP application across the legal entities and different computing environments within the segment. One or more selections of at least two of: the different computing environments, or plurality of legal entities are received and analyzed. The configuration items across the one or more of: the different computing environments or the plurality of legal entities are further analyzed to generate a communication of results in an implementation output based on the one or more selections. The implementation output can include a report of the similarities and differences of the configurations of the configuration items for different application module components between various legal entities, environments, or segments of business, for example.

The following description and the annexed drawings set forth in detail certain illustrative aspects of the disclosed subject matter. These aspects are indicative, however, of but a few of the various ways in which the principles of the various aspects may be employed. The disclosed subject matter is intended to include all such aspects and their equivalents. Other advantages and distinctive features of the disclosed subject matter will become apparent from the following detailed description of the various aspects when considered in conjunction with the drawings.

BRIEF DESCRIPTION OF DRAWINGS

Non-limiting and non-exhaustive aspects of the subject disclosure are described with reference to the following figures, wherein like reference numerals refer to like parts throughout the various views unless otherwise specified.

FIG. 6 illustrates another example implementation output of the ERP configuration manager in accordance with various aspects described herein;

FIG. 7 illustrates another example implementation output of the ERP configuration manager in accordance with various aspects described herein;

DETAILED DESCRIPTION

Figure 1:
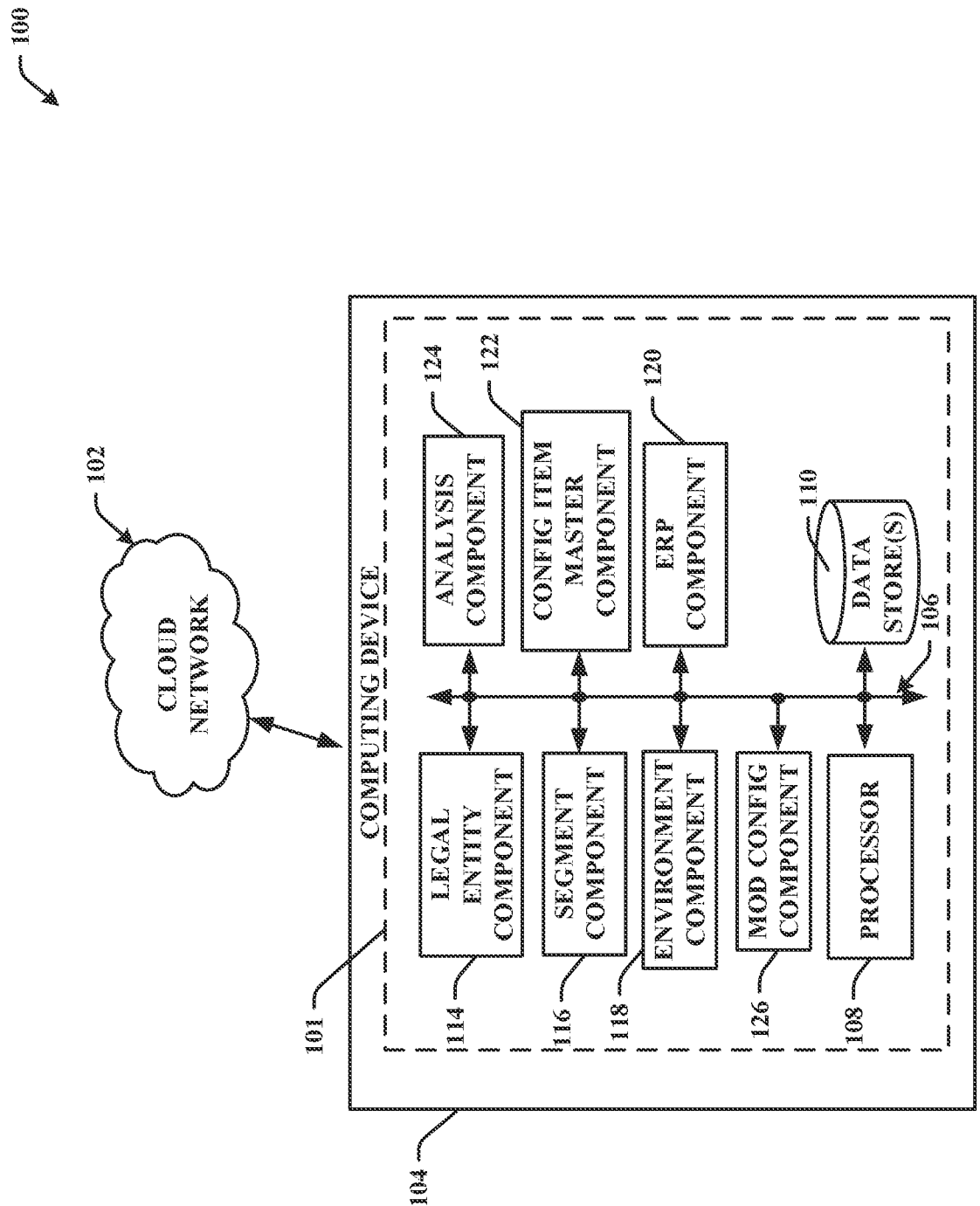
FIG. 1 illustrates an example computing system for an enterprise resource planning (ERP) configuration manager of an ERP application or system in accordance with various aspects described herein.

Aspects and examples are described below with reference to the drawings, wherein like reference numerals are used to refer to like elements throughout. In the following description, for purposes of explanation, numerous specific details in the form of examples are set forth in order to provide a thorough understanding of the various aspects. It will be evident, however, that these specific details are not necessary to the practice of such aspects. In other instances, well-known structures and devices are shown in block diagram form in order to facilitate description of the various aspects.

Reference throughout this specification to "one aspect," or "an aspect," means that a particular feature, structure, or characteristic described in connection with the aspect is included in at least one aspect. Thus, the appearances of the phrase "in one aspect," or "in an aspect," in various places throughout this specification are not necessarily all referring to the same aspect. Furthermore, the particular features, structures, or characteristics may be combined in any suitable manner in one or more aspects.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry or processing circuitry. The electric or electronic processing circuitry can be operated by a software application or a firmware application executed by one or more processors; the one or more processors can be internal or external to the apparatus and can execute at least a part of the software or firmware application along with a memory that communicatively coupled to or comprised by the circuitry. As yet another example, a component can be an apparatus that provides specific functionality through electronic components without mechanical parts; the electronic components can include one or more processors therein to execute software or firmware that confer(s), at least in part, the functionality of the electronic components. In an aspect, a component can emulate an electronic component via a virtual machine, e.g., within a cloud computing system.

The word "exemplary" or "demonstrative" is used herein to mean serving as an example, instance, or illustration. For the avoidance of doubt, the subject matter disclosed herein is not necessarily limited by any one or more examples. In addition, any aspect or aspect described herein as "exemplary" or "demonstrative" is not necessarily to be construed as preferred or advantageous over other aspects or aspects, nor is it meant to preclude equivalent exemplary structures and techniques according to what those of ordinary skill in the art could appreciate. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements. The word "set" or "subset" is also intended to mean "one or more."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

Overview

An ERP application or system can include thousands of application module components, in which the number of application modules continues to be added to, modified, upgraded or updated on an ongoing or periodic basis. Additionally, different computing environments may re-configure the configurations of different application module components within different segments or legal entities. An ERP application or system can be implemented for a multitude of customer relationship and business management solutions either as a front-end office application or via a cloud-based system. The ERP system or ERP application as used herein can further include human resources management executable instructions or code, customer relationship management executable software or code, or the like that can be executed to assist in the management of day-to-day business activities, including accounting, finance, procurement, project management, risk management, compliance, manufacturing, supply chain operations, or business performance management of a business organization to enable planning, budgeting, prediction, and reports associated with the organization's financial and accounting results. The ERP application can be embedded with next-generation technology (e.g., internet of things (IoT) interfacing, blockchain application, artificial intelligence (AI), machine learning, digital assistants, or other technologies). ERPs continue to expand and become a vital component of any large or global organization, especially those that include multiple different businesses or legal entities under a same umbrella organization.

ERP applications or systems contain the potential for thousands of configurations of application module components that may need to be established in one environment for one legal entity and propagated to other computing environments, which may subsequently be changed by modification, upgrade to other versions of the ERP application (or system). Companies usually have multiple legal entities, thus multiplying the number of configuration items even further. Implementors, or users of the ERP application, usually have at least five different phases of implementation of the ERP/computing environments (Dev, Test, Pre-Prod, Master, Production) for one or more legal entities, and at each phase of implementation, the legal entities for an organization can multiply the number of configuration items of application modules for any given business segment or phase of implementation. As an ERP implementation project progresses until production of the ERP organization-wide, each of the computing environments operating the ERP could be cleared and reloaded with various configurations of application module components, for example. If the configuration items are not set correctly, data in that environment and legal entity may not be correct and could erroneously fail a test, cause delay, cause an incorrect setup that is not discovered, and potentially cause a cascading set of problems in production when the ERP is implemented business-, organization-wide.

In consideration of the above-described trends or deficiencies, among other things, various aspects are described that enable an ERP configuration manager of an ERP application or system to takes into account and manage multitudes of application module components associated within the ERP application across various segments of business-related activities, different legal entities, different computing environments, as well as phases of implementation for the ERP application. Each application module component can comprise configuration items that comprise one or more settings or set up parameters for configuring a configuration of the application module component, which established various functions of the application module component within a particular segment of business (e.g., accounts payable, accounts receivable, sales and marketing, human resources, or other like segment). Each configuration item of an application module component further includes setting options or configurations that can be set in a particular configuration or configuration state. Multiple different application module components can be configured for a particular segment of business with different module components or across different segments. Different computing environments can be configured also with different configurations of application module components, and enable modification of the different configuration items of the application module components; so that one computing environment can operate with different configurations of a configuration item for an application module component with respect to another computing environment. Each legal entity can further include different environments. The ERP configuration manager can utilize a differentiating engine that can further map configurations across at least two of: different legal entities, different computing environments, or different segments to generate an output of results as an implementation output to enable dynamic management of differences between configurations of configuration items across different cross-sections of an organization with multiple legal entities for an ERP application. In this manner, a computing environment can be updated, restored, or maintained based on differences observed in the output, as well as from a known state of a computing environment that may have been originally provided to each computing environment, for example.

In various other aspects described herein, a known state of a computing environment can be generated, stored, updated, and communicated in order to dynamically restore, update, mirror or implement another computing environment among various other computing environments according one or more of the legal entities executing the ERP application and the known state. A legal entity as referred herein can include a business, company, corporation or other entity suitable for conducting business-related activities, such as finance operations, human resources, customer and sales management, manufacturing or the other like business-related activities, for example. An organization can include multiple different legal entities for various business operations or business-related activities. A computing environment can include a user's work station or computing device that enables interaction with and execution of a selection and a configuration of various application modules within each segment of business. The computing environments in association with each legal entity can also be configured according to a particular phase of implementation of the ERP application, such as a development phase, a testing phase, pre-production phase, a master phase, a production phase, or other phase of implementation, for example. Initially, each computing environment can operate a version of the known state and can be managed independently at each environment by being modified, updated, executed, or restored based on different application modules and their respective configurations of configuration items in the known state. Different versions of the ERP application may also be utilized, and include or not, various updates that may occur on a regular or periodic basis, including updates, or changes to application module components. The ERP configuration manager can operate to enable users to select and configure different computing environments, different computing environments, and different legal entities that computing environments may be associated with based on the implementation output. Configurations of the configuration items in various application module components can be extracted and compared to analyze the state of a business cross-section, such as across one or more segments in different legal entities, across computing environments, the legal entities, phases of implementation of an ERP application/system, or any one or combination thereof, in order to generate similarities and differences dynamically, along with any business-related feedback in any one particular environment. These results can be generated and provided in an implementation output, enabling the ERP application along a particular cross-section of business of an organization to be set, restored, updated or modified based on the known state or other states of configurations of the application module components. Various other aspects, details and components are further described with reference to the illustrated figures below.

Enterprise Resource Planning (ERP) Configuration Manager

Referring to FIG. 1, illustrated is an example system 100 that provides ERP configuration management in an ERP application with an ERP configuration manager 101 according to various aspects. System 100 with the computing device 104 can include a memory or data store(s) 110 that stores computer executable components and a processor or processing circuitry 108 that executes computer executable components stored in the data store(s), examples of which can also be found with reference to figures disclosed herein and throughout, as in other figures of this disclosure. The processor 108 can include the memory 110 or other data store. The system 100, for example, includes a computing device 104 that can include a mobile device, a smart phone, a laptop, personal digital assistant, personal computer, mobile phone, a hand-held device, digital assistant or other similar device, which can include hardware or software communicating via a network, a wireless or wired transmission, a server, cloud network, or cloud 102, for example.

The computing device 104 operates to process and provide communications and data across the cloud 102 and one or more components, which include, for example, an ERP configuration manager component 101 that includes a legal entity component 114, a segment component 116, an environment component 118, an ERP component 120, a configuration item master component 122, an analysis component 124, an application module configuration component 126, or other components. Each component can be communicatively coupled via a communication line 106 (e.g., an optical link, a bus, a wireless connection, etc.) to obtain business data or content (e.g., business-related activity date or feedback) from various sources and legal entities, aggregate the data via at least the processor 108 with data store(s) 110, and dynamically communicate an analysis of a legal entity or business across segments of business-related activities or operations, one or more legal entities, one or more computing environments, phases of implementation of the ERP application, or different application module components to provide an implementation output for use in the management of an ERP application within an organization. These components can be located together in one computing device, across multiple computing devices, the computing device(s) and the cloud 102, or configured dynamically as firmware/software components in a local system, distributed system or across a network as discussed herein.

The legal entity component 114 can be configured to receive and process a selection for a legal entity that includes a business that conducts business-related activities or functions, which can be a part of an organization of multiple legal entities or businesses, for example, from within or integrated in an ERP application/system with various application module components. A selection may include one or more selections of legal entities at the legal entity component 114 that may be organized for similar or different business-related activities integrated with the ERP application/system. For example, an organization for a piping business may include a financing business, a transportation business, a manufacturing business, a real estate business, as well as various other businesses that may operate under the same organization, either locally or globally in different jurisdictions or national borders, under different legal entities.

Each legal entity can include various business segments or segments of business-related activities associated within it that can be identified via input or a selection received at the segment component 116. For example, one or more legal entities of an organization within an ERP application can include, but is not limited to or herein this disclosure by, a financial services division (or segment), a human resources division, a manufacturing/supply chain division, a procurement division, a project management division, a retail/commerce division, a sales/marketing division, a base functionality division, or other segment of business-relation activities or business operations. Each segment can include different application module components configured with configuration items specific to the associated segment and execute a unique function from one another in the ERP application that are provided for selection, configuration, and functioning in an ERP application by the configuration item master component 122, for example.

The segment component 116 can be configured to receive a selection and identify a segment or division of business-related activity of each legal entity identified at the legal entity component 114. A segment can include application modules or application module components specific to it within an ERP application to enable different business functions associated with the segment or division of the legal entity. Each segment can be configured with different application module components from among various segments, as well as across legal entities or computing environments. The segment component 116 can configure application module components at each segment of a legal entity or across multiple legal entities identified by the legal entity component 114, for example.

The environment component 118 can identify, assign or otherwise establish different computing environments. Each computing environment can comprise a particular state or a known state of configurations of various application module components, of one or more legal entities, or of segment(s) at the computing device 104 or other computing devices with the ERP application. Each computing environment can include a version, copy, or rendition of the ERP configuration manager 101 with an ERP application (system) and include one or more components as illustrated, including any processing circuitry and data store, which can be modified, tested, and developed separately and independently of other computing environments. Each computing environment can function or be configured with different configurations of configuration items of application module components according to a phase of implementation of the ERP application. A phase of implementation, for example, can include a development phase, a testing phase, a production phase, a pre-production phase, a master phase, or other phase of implementation of the ERP application that enables a particular version of the ERP application in a state to be changed and tested differently compared to other states and with different configurations.

The environment component 118 is configured to update the known state based on business-related feedback received from the state of a particular computing environment, or update or restore the state of the particular computing environment according to the known state of a computing environment. As such, the environment component 118 can propagate or enable multiple computing environments that are in different states, or with different configurations of various application module components/segments/legal entities, to be modified for testing or development, depending on a phase of implementation of the ERP application for one or more legal entities to efficiently update and restore the state of the computing environment to the known state or update the known state based on feedback from another computing environment, for example. In particular, various environments in a phase of implementation of the ERP application can be cleared and restored/reloaded with an original state such as the known state. If configuration items are not configured correctly, or as intended, data in the environment and legal entity may not be correct or uniform across computing environments, one or more segments, or legal entities, which may cause a test failure that could cause delays or incorrectly setting up the ERP application for business production if not discovered, or a cascade of other problems in a production phase of the ERP application when used outside of being tested or developed.

The analysis component 124 can enable and process identification or selection of various configuration items of application module components. Data of the configurations of the configuration items can be extracted and compared to identify any differences across environments, legal entities or segments and the configurations of configuration items of application module component associated therewith. These differences and similarities can then be reported in an implementation output to allow users to determine whether any updates should occur in the different environments, with different configurations, in one or more legal entities, phases of implementation of the ERP application, or one or more segments. For example, data related to the configurations of configuration items can be tagged and stored so that a tagged configuration of a configuration item can be used to update the ERP application/system setting(s) or state to the known state of a computing environment, a legal entity, a segment, or phase of implementation (of the ERP application).

The application module configuration component 126 of the ERP configuration manager component 101 can be configured to identify, select, configure, set, provide, or update one or more application module components in the ERP application according to a segment, a legal entity, a computing environment. The application module configuration component 126, for example, can identify which application module components are to be used for generating the implementation output based on one or more selections of legal entities, segments, computing environments, for example. Application module components, as used herein, can include components that function specifics for back and front office functions, including finance, accounting, procurement, manufacturing, inventory management, order management, warehouse management, supply chain management, customer relationship management procurement, workforce management, or other business relation management functions, such as human resources management, e-commerce, marketing or the like. As such, each application module component can be configured for specific business functions, providing related business data and executing business functions and processes that assist employees of legal entities to perform their jobs via the ERP application (or ERP system as used herein) with the implementation output of the ERP configuration manager.

Figure 2:
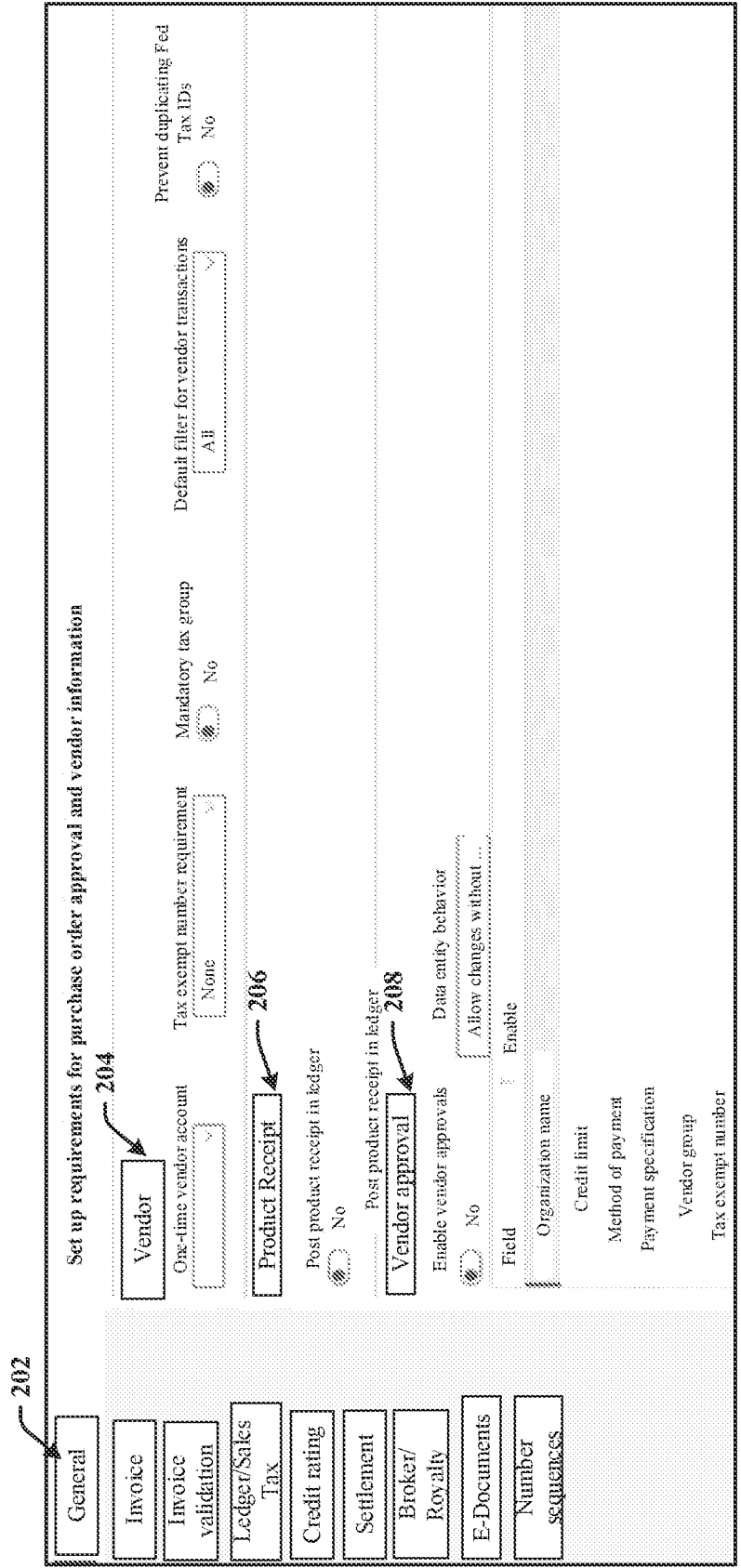
FIG. 2 illustrates an example application module component for the ERP configuration manager in accordance with various aspects described herein.

Referring briefly to FIG. 2, illustrated is an example application module component 200 as one example of a multitude of various application module components that can be selected by a user of an ERP application (e.g., via the application module configuration component 126) and then be associated with a legal entity, segment or particular phase of implementation of the ERP application.

Figure 3:
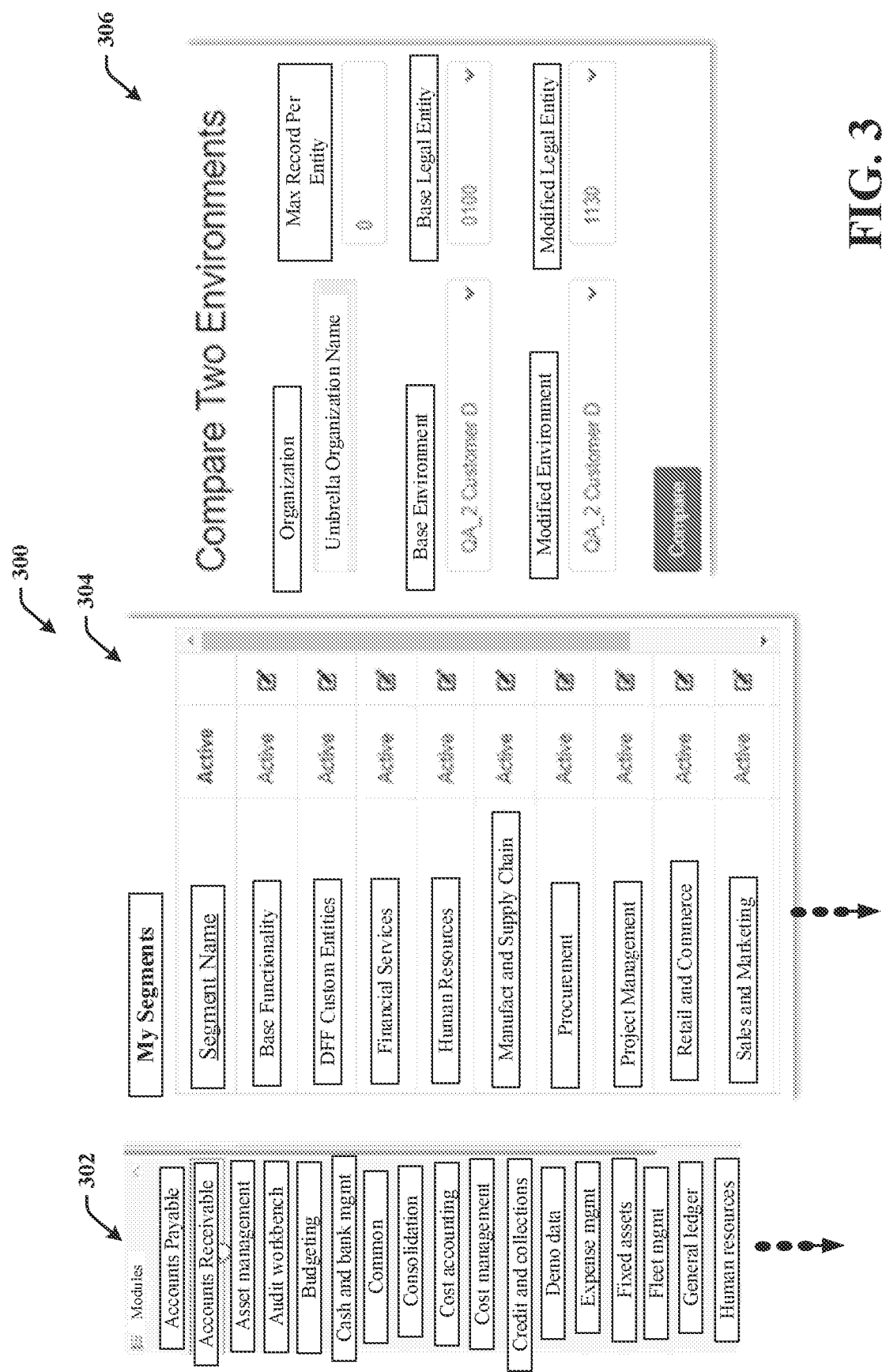
FIG. 3 illustrates example application module components, segments and comparison interface for the ERP configuration manager in accordance with various aspects described herein.

Application module component 200 can be configured as an Accounts Payable (AP) application module component, for example, comprising various configuration items 204 thru 208 associated with a group of configuration items parameters (parameters settings/category) from various groups 202 of configuration items, as grouped according to related parameters, such as illustrated with a "General" grouping in this example illustration for the AP application module component 200. Although the application module component 200 is illustrated, for example, for AP business-related activities/functions/operations/processes, for example, the application module components can include, but are not limited to, for the sake of brevity, the following example application module components for executing various business-related activities (functions, operations, or processes): "Accounts payable", "Accounts receivable", "Asset management", "Audit workbench", "Budgeting", "Cash and bank management", "Consolidations", "Cost accounting", "Cost management", "Credit and collections", "Demo data", "Expense management", "Fixed assets", "Fleet management", "Expense management", "General ledger", "Human resources", "Inventory management", "Master planning", "Organization administration", "Payroll", "Procurement and sourcing", "Production information management", "Production control", "Process manufacturing", "Procurement and sourcing", "Project management and accounting", "Project manufacturing", "Regional regulatory features", "Sales agreements", "Sales and marketing tasks", "Sales orders", "Sales quotations", "Warehouse management", as well as other similar application module components that can configure various business-related functions to be executed along particular business-related activities, or business tasks of parameter categories, which can be associated within a particular legal entity or segment, and includes, but is not limited to, commerce, finance, supply chain management, human resources or other segment of one or more legal entities in an organization configuring the ERP application. Another example of various application modules 302 is illustrated at FIG. 3 as application module components (listed under "modules") that can be selected from, configured, and associated with any segment, legal entity or computing environment, for example, via the module configuration component 126. However, other application module components or modules can be added, or removed, as well as upgraded according to management of the ERP application, and these examples are not exhaustive for business-related activities/functions/operations/processes as a part of day-to-day business management via the ERP application.

Each application module component includes configuration items (e.g., 204 thru 208, or other different configuration items depending the type of module component) that can be configured into a configuration for each business-related activities associated with the application module component via the ERP application and the ERP configuration manager component 101. The configuration of a configuration item 204 thru 208, for example, can be configured depending on how the various settings are set by a user, as illustrated under each configuration item 204 thru 208. For example, the "vendor" configuration item 204 under the "General" group of parameters can be configured differently depending on various configurations of a "one-time vendor account" setting or state, a "Tax exempt number requirement", a "Mandatory tax group", a "Default filter for vendor transactions", a "Prevent duplicating Fed Tax IDs", or other setting for a configuration item of an application module component. Each of these settings (referred to as configurations of a configuration item) can configure the particular configuration item differently for ensuring different business functions/operations/processes/activities are performed as desired by the user via the ERP application in the particular application module component. Each legal entity, segment, or computing environment as selected and configured via the ERP application can have different configurations of a configuration item so that the AP application module component 200 can have different configurations for configuration item 204 across different legal entities, segments, environments, or phases of implementation. Alternatively, or additionally, application components can have similar configurations of a configuration item. The ERP configuration manger 101 can operate to analyze and report the similarities and differences in configurations across these various axis (legal entities, segments, environments, phases of implementation) in order to provide an output that makes implementation of the ERP application efficient and cost effective, while enabling dynamic and seamless business-related activities to incorporate feedback and updates on a regular basis across each.

In particular, each application module component can include a number of areas/categories of groups 202 of configuration items, as groups of business functions associated with a particular type of an application module component. For example, each group 202 of configuration items for an application module component can include setup parameters or different groups of setup parameters (or setup parameter categories) that configure various configuration items as parameter settings for various related business functions within the same application module component(s). The configuration items include parameter settings or a parameter with various settings or parameter setting options that configure what is referred to as configurations (as configuration states) of the application module component and enable the particular application module component to function for collecting, storing, managing, implementing, or interpreting data, for example, for related-business activities in one or more segments, in one or more computing environments, one or more legal entities, or phase(s) of implementation. In this manner, the configurations can be different for the same application module (e.g., an AP application module component) across or within each of these legal entities, segments, environments, or phases. The application module components can be configured differently among different legal entities as well as among different computing environments communicatively coupled to the ERP or as an integrated part of the ERP application; and each segment, legal entity, computing environment, or phase of implementation can be configured with different application module components within the ERP application of an organization depending on user selection and implementation in the ERP application via the application module configuration component 126.

For example, the accounts payable (AP) module component 200, including AP parameter groupings 202 of configuration items, can include, but are not limited to, for example, "General", "Invoice" "Invoice validation", "Ledger/Sales tax", "Credit rating", "Settlement", "Broker/Royalty", "Electronic (E)-Documents", "Number sequences", or other parameter groups or categories that can be different depending on the type of application module component, a related segment of business, legal entity, or other desired business-related activity to be implemented via the ERP application. Each group 202 can include different potential configurations of various configuration items 204 thru 206, for example, and can be configured with the AP module configuration items 204 thru 206 for a particular legal entity, segment, or computer environment that is selected to be associated therewith. The AP configuration items 204 thru 208 of the AP module component 200 can be configured differently among different environments for a same legal entity, or can be configured the same or differently among different legal entities, for example. Each configuration of a configuration item 204 thru 206 can enable collecting, storing, managing, implementing, or interpreting data, for example, for an associated related-business activity of a legal entity. As such, multiple legal entities could be configured across the globe, in which the AP module component 200 for each legal entity may have configuration items 204 thru 206 with a same or different configurations between the legal entities for a same type of application module component (e.g., an AP module component, or other type of application module component with different configuration items specific to a business-related function and group of configuration items). Different configurations (e.g., of different configuration items (e.g., 204, or the like) in an application module component can be configured or set up for a legal entity so that the application module component functions in the ERP application for business feedback accordingly. The feedback can be inputted into the ERP application or ERP configuration manager 101 and together with the implementation output indicating differences and similarities among configurations of any number or type of application module components used to reconfigure the computing environments, update a known state prior to transitioning to a next phase of implementation, make configurations uniform across a segment or legal entities, evaluate current states of configurations in the ERP application, update an environment of one or more legal entities in the organization via the ERP application.

In one example, configuration items 204 thru 206 for the AP module component 200 can include, in the "general" group, for example, "vendor" configuration items 204, "product receipt" configuration items 206, "vendor approval" configuration items 206, or other like configuration items, each having a number of configuration items to enable different configurations or configuration states of the AP module component 200 for functioning in the ERP application. For example, the product receipt configuration item 206 can have a configuration of "no" for posting a product receipt in a ledger, or be set to be posted as possible configurations if "no" is not selected.

Each of the configurations can be configured based on a number of options for the particular configuration item. For example, the "vendor" configuration item 204 can include configurations such as the vendor account, the tax exempt number, a mandatory tax group, a default filter, or a prevent duplicating federal tax IDs, each of which can include configurations from one or more: fields to select from, menus, a switch setting for filtering, or other interface for configuring a configuration within a configuration item, for example. Additionally, configuration items can have a different number of configurations, in which the "product receipt" configuration item 206 has only two possible configurations "no" and not "not" (e.g., "yes"). Each application module component can be configured to function via the different configurations of different configuration items in a similar manner, but differently based on different business-related activities associated with a particular application module component being within/associated with each segment or legal entity.

Referring again to FIG. 1, the analysis component 124 can further operate as a web application that comprises computer executable instructions or code that can be deployed or executed via the cloud network 102, server, data store 110, or other storage system, computer device, or computing environment. The analysis component 124 can operate to configure or execute a differencing engine, set of processes or other component, in which all the configuration item data or configurations of the configuration items in application module components can be extracted and stored for execution and gathering of feedback on business-related activities of different computing environments for various legal entities. The analysis component 124 can further generate a communication of results in an implementation output based on the selection. For example, a report or implementation output can be generated as input to the ERP component 120 or other component in order to provide a number of similarities in the configuration items, a number of differences in the configuration items, an identification of which configuration items can be cross-selected among either legal entities, computing environments, segments, or other organization cross-section, for example. Any differences of configuration items can be identified and compared in the implementation output in order to enable modification, updating, or restoring of one difference to another computing environment, legal entity, or segment interactively via the ERP application. A cross-section as referred to herein can include rows, columns, and other dimension of legal entities, segments, or computing environments mapped along a three dimensional grid with an x-, y-, z-, vertical, horizontal, third-independent variable, axes, for example. The implementation output can include differences and similarities in configuration items as a function of, or in comparison with a known state, or an original state of the configurations across an entire organization or various legal entities. In this manner, each phase of implementation, as well as each version of the ERP application when updated or revised, can be maintained, restored, or modified based on a base comparison with the known state. The known state can be configured according to a master list generated by the configuration item master component 122, for example, or a state of configurations of a particular computing environment. The implementation output can include a difference summary with a subset of the configurations with the number of different configurations that are configured between or within at least two of: the different computing environments, legal entities, or segments for one or more configuration items. The subset of configurations can be mapped across the selected cross-section of the at least two selections, and provided with description of the similarities and differences, for example, in the implementation output.

Additionally, or alternatively, the implementation output can provide an identification of any issues or types of issues arising from the analysis and comparison of different application module components or their respective configurations, such as within the same type of module component, across one or more segments, legal entities, or computing environments, for example. The types of issues that can be identified in the implementation output can include one or more of: an upgraded version of one of the different computing environments, a bad entity, or an entity not configured with respect to a configuration item, wherein the types of issues are identified from among the different computing environments, legal entities, or segments, for example. A bad entity can be one that is not valid, within the same phase of implementation, for example, via the ERP application, or does not exist based on the user input or a selection received for a particular legal entity.

The configuration item master component 122 can be configured to generate, update or maintain a master list or master data set of configuration items or application module components that are specific to the ERP application and various versions resulting from the adding, removal, or otherwise updating of the ERP application (e.g., from version 10.0.10 to version 10.0.24, or other version). The master list can include application module components and their current configurations of configuration items specific to a legal entity, a segment of the legal entity, one or more computing environments, the phase of implementation, the organization including all or a part of associated legal entities and based on application modules configured or selected via the application configuration module component 126. The configuration item master component 122 can utilize the master list of configuration items to configure the computing device 102 as a computing environment for the ERP configuration manager 101 in the ERP application to function accordingly across the one or more legal entities, segments, or environments, as well as in different phases of implementation of the ERP application. The master list can include code or a copy of a state of the organization or a cross-section thereof that establishes or initializes the known state of a master computing environment or a particular version of a computing environment, for example.

The ERP component 120 can be configured to facilitate, manage, update, or modify the ERP application, as well as manage application module components being offered. The ERP component 120 can include executable instructions, or code, to deploy each environment where configuration items can be managed and configured, along with an execution history of log data and processing of business-related feedback by which other components can use for generating an implementation output for a comparison of any differences in the configurations, for example.

Referring to FIG. 3, illustrated are examples of different interfaces and outputs 300 of the ERP configuration manager of an ERP application (or system) according to various aspects herein. As discussed above, an example of various application module components 302 are illustrated that can be selected and further configured (e.g., via the application module configuration component 126) for any legal entity, segment, or computing environment, which can include, but not necessarily limited to, the various module components illustrated and described herein.

An example of various segments 304 are illustrated, which can be selected as a part of a cross-section or a comparison for analysis via the analysis component 124. The segments 304 can include, but are not limited to, various divisions of business-related activities including one or more of: a base functionality segment, a description flex field (FFT) segment, a financial service segment, a human resources segment, a manufacturing and supply chain segment, a procurement segment, a project management segment, a retail and commerce segment, a sales and marketing segment, or other segment, in which each include different ones of the application module components configured with configuration items specific to an associated segment to execute a unique function of configurations from other segments or configurations in the ERP application. Each of the segments 304 can include unique functions or business processes from among one another in the ERP application, and with different application modules associated therewith based on either user selection or a categorization of module components within a particular segment according to a sector or category of business processes. Different business-related functions can be configured separately within each segment according to different application module components. A segment can span different legal entities. For example, more than one legal entity can have a human resources segment, or other segment that spans the legal entities.

One or more legal entities, as well as a phase of implementation of the ERP application can be identified, along with one or more segments of business or business-related activities can be combined for analysis and comparison via the analysis component 124 at an implementation input interface 306 for generating an implementation output. An output of the data in an implementation output can facilitate efficiency in updating or the configuration of various configurations via the other components of the ERP configuration manager 101 and assist organizations to certify the accuracy of business-related information by verifying one or more known states of computing environments and legal entities across segments of business.

Configurations of configuration items that configure the application module components of the ERP application across different legal entities within the segment and different computing environments can be determined and selected for analysis and extraction of data by a user of the ERP application to generate different implementation outputs. The configurations can be grouped in a hierarchy or a hierarchical structure with a segment being selected at the highest level of the hierarchy. Configuration data beneath the segments can be grouped into application module components (e.g., AP module component, accounts receivable module component, retail and commerce module component, or other application module components). Beneath the application module components can be various configuration items with different setting data or configurations. Any changes made on a comparison or the implementation output via the analysis component 124 can be user, computing environment, specific and execution of the comparison specific. The ERP manager thus can compare a modified environment or entity across a segment or segments and report the findings of any differences and similarities.

An example comparison with various selections is illustrated at the comparison input selection interface 306. For example, two or more different computing environments can be selected for an organization for comparison. The different environments can be selected as a base environment for comparison with a modified or different computing environment. The organization comprising various legal entities can be selected, as well as different legal entities that are either associated or not with the selected environments. A comparison can be generated between any two or more legal entities, any two or more computing environments, along any one or more segments, or any combination thereof.

Figure 4:
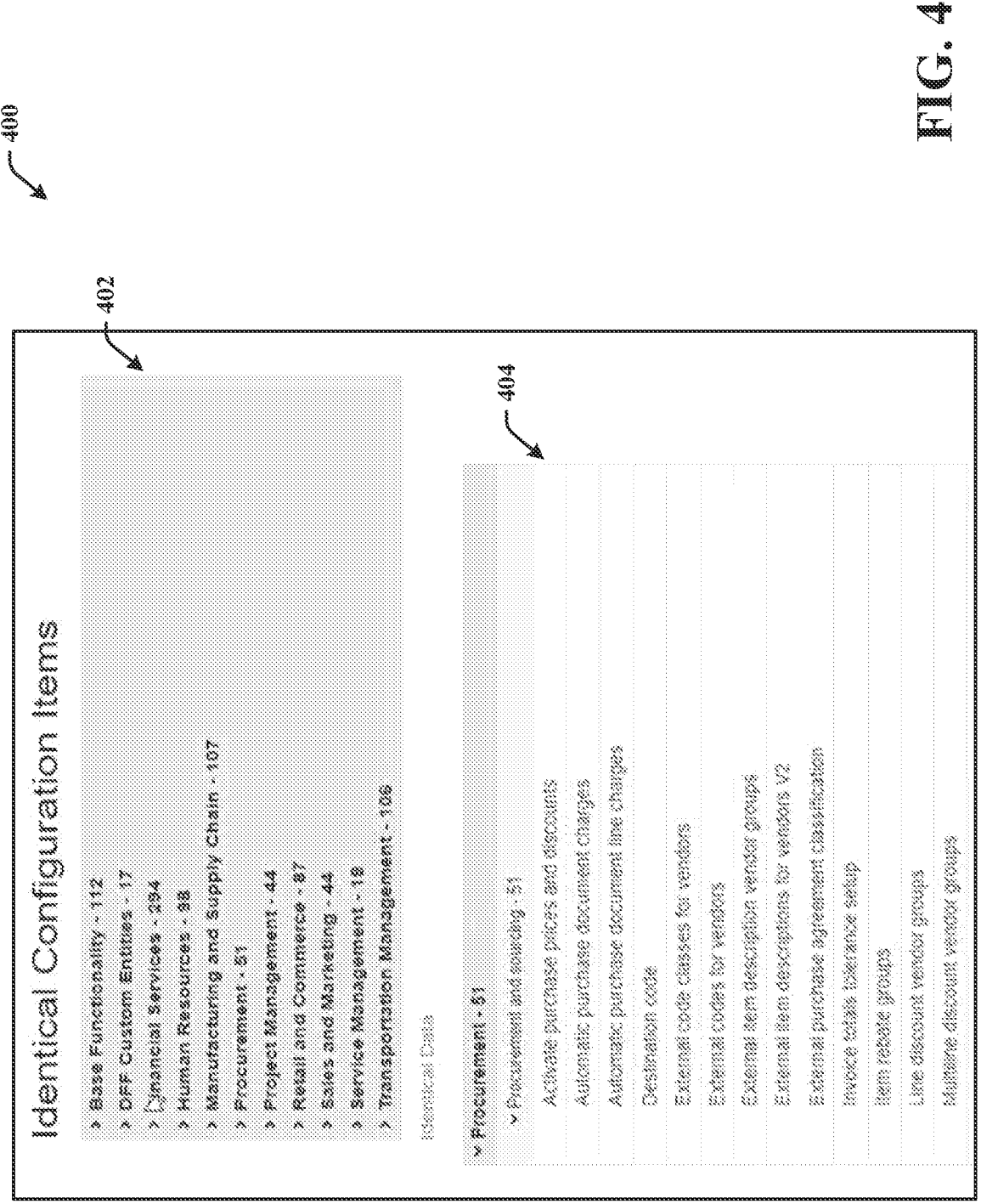
FIG. 4 illustrates example implementation output of the ERP configuration manager in accordance with various aspects described herein.

Referring to FIG. 4, illustrated are example portions of an implementation output 400 of the ERP configuration manager in accord with various aspects herein. In an aspect, the implementation output 400 can include various sections of data that are communicated as an output of results to one or more other components or computing devices for processing, incorporating, and re-configuring configurations of legal entities, segments, or computing environments based on the feedback of other business-related entities associated with the functioning of a particular application module component or a section of data of the implementation output.

In one example, the implementation output 400 can include a data set, a summary, a spreadsheet (e.g., an MS spreadsheet) or the like, and further include sections comprising an identical configuration items summary or data, and various configuration items that can be accessed through the implementation output as a function of or based on a segment of business-related activities. For example, the procurement segment (related to various business-related activities generally involving the obtainment of goods and services a legal entity may need to support its daily operations, such as purchasing items, sourcing, inspecting goods, records, etc.). Each segment can have an ordinary definition as one of ordinary skill in the art can appreciate. The application module components associated with the segment of procurement includes 51 identical configuration items of various application module components. These configuration items may be identical across at least two of: one or more environments or one or more legal entities or other segments, for example. The configuration items and additional information related to each can further be selected and compared by further sections of the implementation output 400. For example, flowing from the input interface 306 of FIG. 3, and then the implementation output 400 thereof, the configuration items (e.g., as illustrated by example at 404) can be those that were identified by the analysis component 124 as being identical across two computing environments after being processed. As such, the identical configuration items provided in the implementation output 400 can have a same number of rows and columns and the data itself identical across two different computing environments, where the various segments and legal entities of the different environments are aligned along vertical, horizontal and spatial axes such as in a matrix configuration for analysis as further described supra with respect to FIG. 9, for example.

Figure 5:
FIG. 5 illustrates another example implementation output of the ERP configuration manager in accordance with various aspects described herein.

Referring to FIG. 5, illustrated is an example of a difference summary 500 as another portion of the implementation output 400 in accord with various aspects. Where differences are found (e.g., via the analysis component 124 of the ERP configuration manager component 101), each configuration item by segment and application module component, can be provided along with a number of differences discovered. When a configuration item is highlighted or selected, for example, the differences can be displayed or provided interactively enabling a user to quickly review the differences and where they are in organization via the ERP application. Further, selecting an export button can generate a spreadsheet of the data or other data set for either inputting as feedback back into one or more other components, to other computing environments, electronic mail, for printing, being stored in the data store 110, cloud-based application or cloud server, or the like together with various details of the differences.

In an aspect, the analysis component 124 can be configured to provide batch processing to users upon selecting an option (not shown) to execute a comparison or analysis so that the ERP configuration manager 101 operates to implement a set or standard default set of comparisons, based on particular legal entities, computing environments, segments, or configurations. This can be set to export the results of comparison at different periods of time or a set period. For example, a user can utilize the export settings to provide a batch of comparisons executed by the analysis component 124 at set times, such as at every 1 am, start of business day, or the like. The comparisons can be executed automatically and exported to be available to the user on a periodic basis according to set times or period with particular legal entities, computing environments, segments, or configurations. This can enable an efficient monitoring of ERP feedback or business results as well as analysis of changing data across a cross-section of the organization.

Referring to FIG. 6, illustrates are example details of differences 600 as another portion of the implementation output 400 in accord with various aspects herein. The details of differences 602 is an example of differences in a "vendor payment method" configuration items, which, for example, can be across different environments, as well as same or different legal entities in a segment. The differences can be observed at under a "bank transaction type" field, for example, where the one operates as "05" and the other environment as "03", in which different bank transactions types are being identified. In a further example, the class ID in one environment is "0" and the other is "3376". Other differences may also exist in this configuration item across different environments, for example. The differences can enable a user or system to develop, test, pre-produce, set a master or known state in a master or other computing environment, and determine what correct or desired configurations should or should not be. The differences can be modified via the ERP configuration manager component 101 in order to re-run or execute the system while maintaining a copy of a known state for re-configuring, or setting different environments based thereon or an updated version of the ERP, for example.

Another example can be seen in the details of differences 604 for an organization email template. A difference detail in this configuration item of an application module component can be observed in the type of email that is being configured to be sent for this configuration. In one environment, an "order ready for in-store pickup" is being sent while at another computing environment an "order confirmation e-mail" is being utilized. The differences can then be easily modified, updated, or otherwise kept depending on the different legal entities and their associated operations for daily business based on the implementation output (e.g., 400). These are only two examples for description purposes of the details of differences section of an implementation report, but hundreds if not thousands of differences could be provided in any one implementation output depending on the selection of legal entity, segment, or computer environment being used for comparison to another and the organization of legal entities.

The details of differences, as illustrated for example as 602, 604, can include other description fields thereat or in the difference summary 500, which can include rows that exist in a base but not in a modified or second environment/other selection, a new row/column, a changed field, or not changed field, for example, as indicated in the descriptions of the different fields related to determining how to read the comparison results in the implementation output 400. These rows and columns, for example, can indicate exactly where in a master list or comparison of the two environments configurations have been added, removed, changed, or vary, for example.

Referring to FIG. 7, illustrated is another example of a portion or section of the implementation output 400 that includes an identification of any issues section 700 in accord with various aspects. The implementation output can further be generated with an issues section 700 where if any issues or problems in comparing for an implementation output are identified with particular configuration items, they are flagged and reported. Different types of issues can be associated with the configurations of a configuration item, in which the types of issues can include one or more of: an upgraded version of one of the different computing environments, a bad entity, or an entity not configured with respect to a configuration item. For example, an issue can include a configuration key not being found, which means the configuration item or entity is not configured or enabled. Another issue can include an entity not found, in which this is likely a result of the entity mentioned or configuration item is from a newer or updated version than what it is being compared to. Yet another issue can include a bad container or bad entity where the ERP configuration manager 101 is referencing an entity is should not or should be changed.

Figure 8:
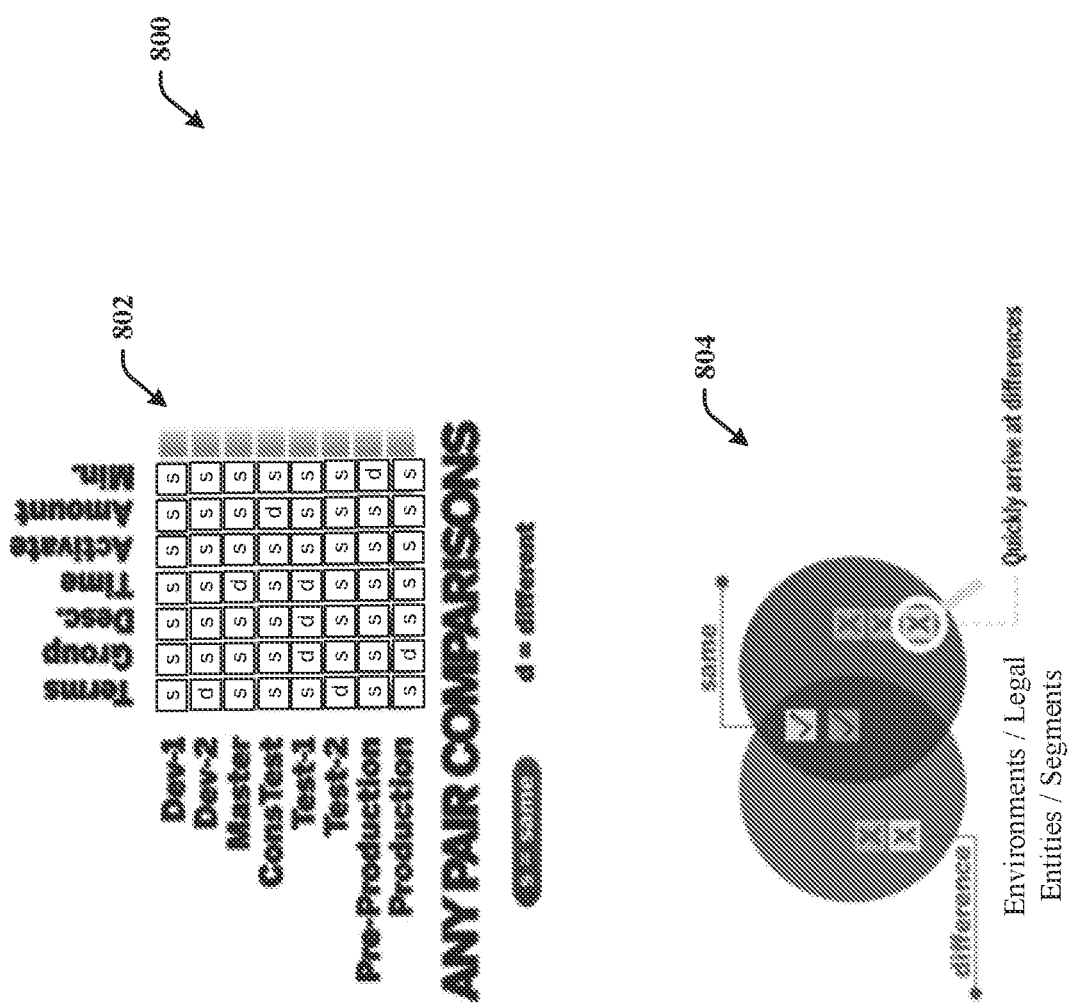
FIG. 8 illustrates another example implementation output of the ERP configuration manager in accordance with various aspects described herein.

Referring to FIG. 8, illustrates other example implementation outputs 800 of the ERP configuration manager in accord with various aspects herein. In an aspect, a comparison or analysis via the analysis component 124 can be performed between two or more legal entities, segments, or environments, as well as a phase of implementation of the ERP application. The various phases of implementation can include a development phase for developing various configurations from a base state or known state in various computing environments among one or more legal entities. A master phase can include configuring a known state before or after any other phase of implementation, in which to reset or modify a computing environment with the known state. A testing phase can involve testing at different computing environments and acquiring feedback on business-related activities according to the functioning of various configurations that were developed in a development phase. Pre-production can involve operating before full scale-production or organization-wide implementation of the ERP application with tested configurations of configuration items in the ERP application. Production can involve a complete roll-out or implementation of the configurations of configuration items selected across all legal entities of an organization for full-scale implementation of the ERP.

The implementation output 802 can also be included in another section of the implementation output 400 discussed above for demonstration graphically various differences and comparisons along with the other sections discussed to demonstrate a number of similarities in configurations and a number of differences in configurations, along with an identification and description of each. Each row and column can indicate one or more computing environments, legal entities or segments based on a phase of implementation at the computing environment. For example, Developer-1 (Dev-1) includes all similarities in a comparison for implementation output along all fields, including terms, a grouping, a description of the configuration, a time, a particular activate, an amount, minimum, or any other field. Accordingly, the implementation output 400, 800 can report differences across structure and data additions, deletions, changes or the like to configurations by comparing computing environments, legal entities, or segments associated with the configurations and identify similarities or differences based on a row and a column. The ERP configuration manager component 101 can thus certify the accuracy of business-related information from the various configurations by verifying a known state or known states across a cross-section of an organization. Other phases of implementation can be indicated as a master phase (Master), a testing phase (Cons Test, Test-1, Test-2, etc.), pre-production, or production, for example, across different computing environments or legal entities.

The implementation output 804 can be an additional or alternative section of implementation output 400, quickly demonstrating graphically a number of similarities and differences of configurations within different computing environments, legal entities, or one or more segments. The differences and similarities can be further entered into by active link or interface to the further details of the implementation output discussed herein this disclosure with the various aspects.

Figure 9:
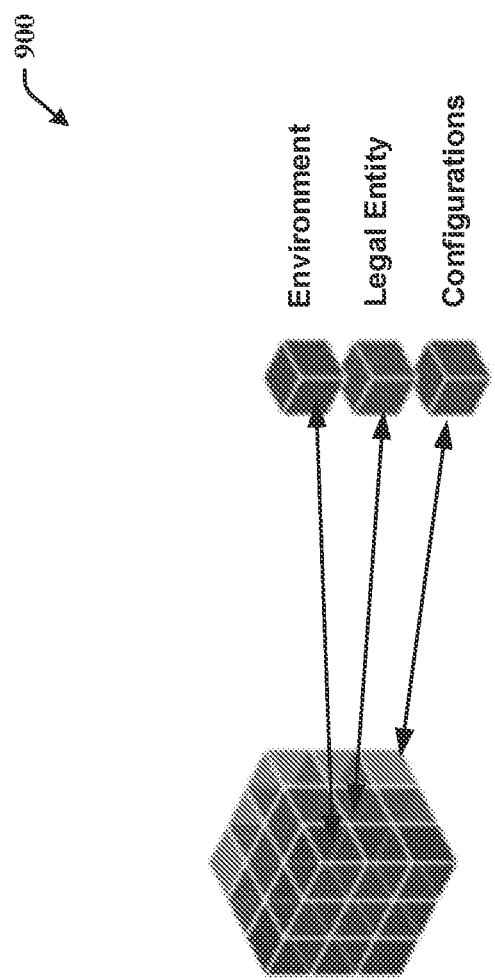
FIG. 9 illustrates example mapping of data with the ERP configuration manager in accordance with various aspects described herein.

Referring to FIG. 9, illustrated is an example three-dimensional matrix configuration 900 in accord with various aspects herein. Rows and columns can be identified in the implementation output that map to various legal entities and computing environments with various configurations of the configuration items. The environments map to the first cross-section or slice along a vertical and horizontal axis. Moving from right to left, another cross-section or slice can represent the legal entities, and farthest left cross-section the configurations.

As discussed above, the implementation output can be generated as input to the ERP component 120, analysis component 124, or other component in order provide a number of similarities in the configuration items, a number of differences in the configuration items, an identification of which configuration items are being cross-selected among legal entities and computing environments. Any differences of configuration items can be identified and compared in the implementation output in order to enable modification, updating, or restoring of one difference to another interactively via the ERP application. A cross-section as referred to herein can include rows, columns, and third dimension with legal entities, segments, or computing environments mapped along a three dimensional grid with a vertical, horizontal, third-spatial axes, for example. The implementation output can include differences and similarities in configuration items as a function of, or in comparison with a known state, or an original state of the configurations across an entire organization or various legal entities. Thus, each phase of implementation, as well as each version of the ERP application when updated or revised, can be maintained, restored, or modified based on a base comparison with the known state. The known state can be configured according to a master list generated by the configuration item master component 122, for example, or a state of configurations of a particular computing environment. The implementation output can include a difference summary with a subset of the configurations with the number of different configurations that are configured between or within at least two of: the different computing environments, legal entities, or segments for one or more configuration items. The subset of configurations can be mapped across the selected cross-section of at least two selections, and provided with a description of the similarities and differences.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or aspects of the description herein. Further, one or more of the acts depicted herein may be carried out in one or more separate acts and/or phases. Reference may be made to the figures described above for ease of description. However, the methods are not limited to any particular aspect or example provided within this disclosure and can be applied to any of the systems disclosed herein.

Figure 10:
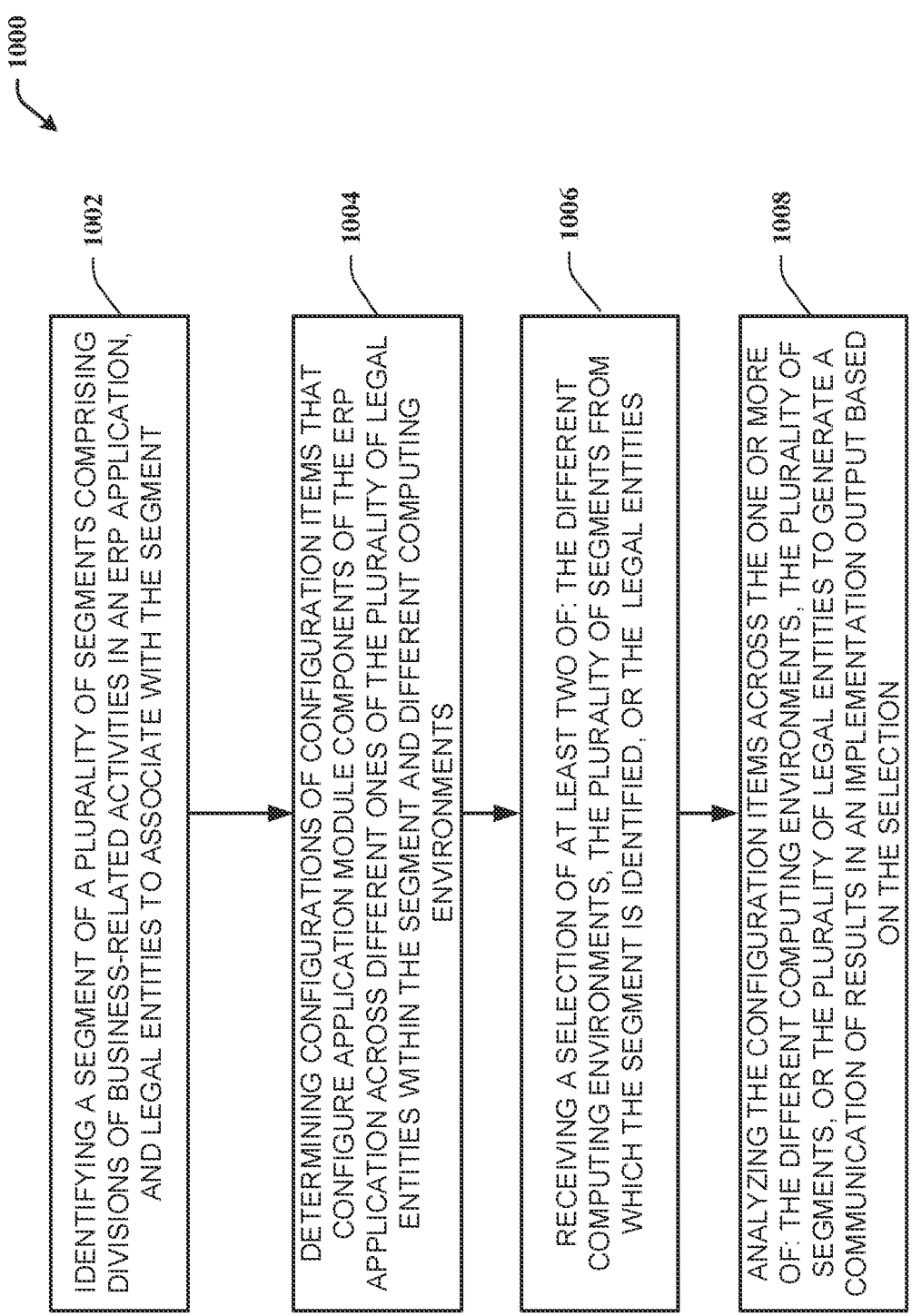
FIG. 10 illustrates another example of a process flow for an ERP configuration manager component in accordance with various aspects described herein.

Referring to FIG. 10, illustrated is an example process flow 1000 for an ERP configuration manager component in accord with various aspects herein.

At 1002, the process flow 1000 can include identifying a segment of a plurality of segments comprising divisions of business-related activities in an enterprise resource planning (ERP) application, and a plurality of legal entities to associate with the segment.

At 1004, the process flow 1000 further includes determining configurations of configuration items that configure application module components of the ERP application across different ones of the plurality of legal entities within the segment and different computing environments.

At 1006, the process flow 1000 further includes receiving a selection of at least two of: the different computing environments, the plurality of segments from which the segment is identified, or the plurality of legal entities.

At 1008, the process flow 1000 further includes analyzing the configuration items across the one or more of: the different computing environments, the plurality of segments, or the plurality of legal entities to generate a communication of results in an implementation output based on the selection.

In an aspect, the process flow 1000 can further include configuring a known state of a computing environment comprising the configurations of the configuration items based on the segment and one or more legal entities of the plurality of legal entities, wherein the known state of the computing environment is configured for deploying the ERP application in a phase of implementation of the ERP application. This can be completed during a phase of implementation, or prior to transitioning to a next phase of implementation of the ERP application.

Additionally, or alternatively, generating the different computing environments can be established, generated or configured at one or more legal entities. Information associated with the configuration items can be received from one or more legal entities and the different computing environments. Then similarities and differences can be provided in the communication of results for the implementation output. The implementation output can include an identification of a number of identical configurations of the configuration items and a number of different configurations of the configuration items across the one or more legal entities based on one or more of: the different computing environments or a known state of a computing environment, for example.

Additionally, or alternatively, different types of issues associated with the configurations of the configuration items between the different computing environments for the plurality of legal entities can be identified or reported. The types of issues, for example, can comprise one or more of: an upgraded version of one of the different computing environments, a bad entity, or an entity not configured with respect to a configuration item, in which the types of issues can be identified from among the different computing environments, for example. An implementation output can then be provided with the types of issues to one or more of the different computing environments via a network server or a cloud-based application, for example. The implementation output can comprise a difference summary with a subset of the configurations with the number of different configurations that are configured between the at least two of: the different computing environments, the plurality of legal entities, or the plurality of segments based on one or more configuration items.

The ERP configuration manager can be configured for restoring at least one configuration of the subset of the configurations to the known state of a computing environment or at least one of the different computing environments based on the difference summary. Additionally, or alternatively, the known state of a computing environment associated with configuration items can be updated based on business-related feedback resulting from an execution of at least one of the different computing environments with the ERP application or the implementation output to ensure consistent business operations and efficient business data output. The data can be mapped across the segments, the application module components, and the configuration items in a hierarchy at each of the different computing environments and the plurality of legal entities and the different computing environments can be configured to execute the application module components within the segment across the plurality of legal entities based on the mapping.

Figure 11:
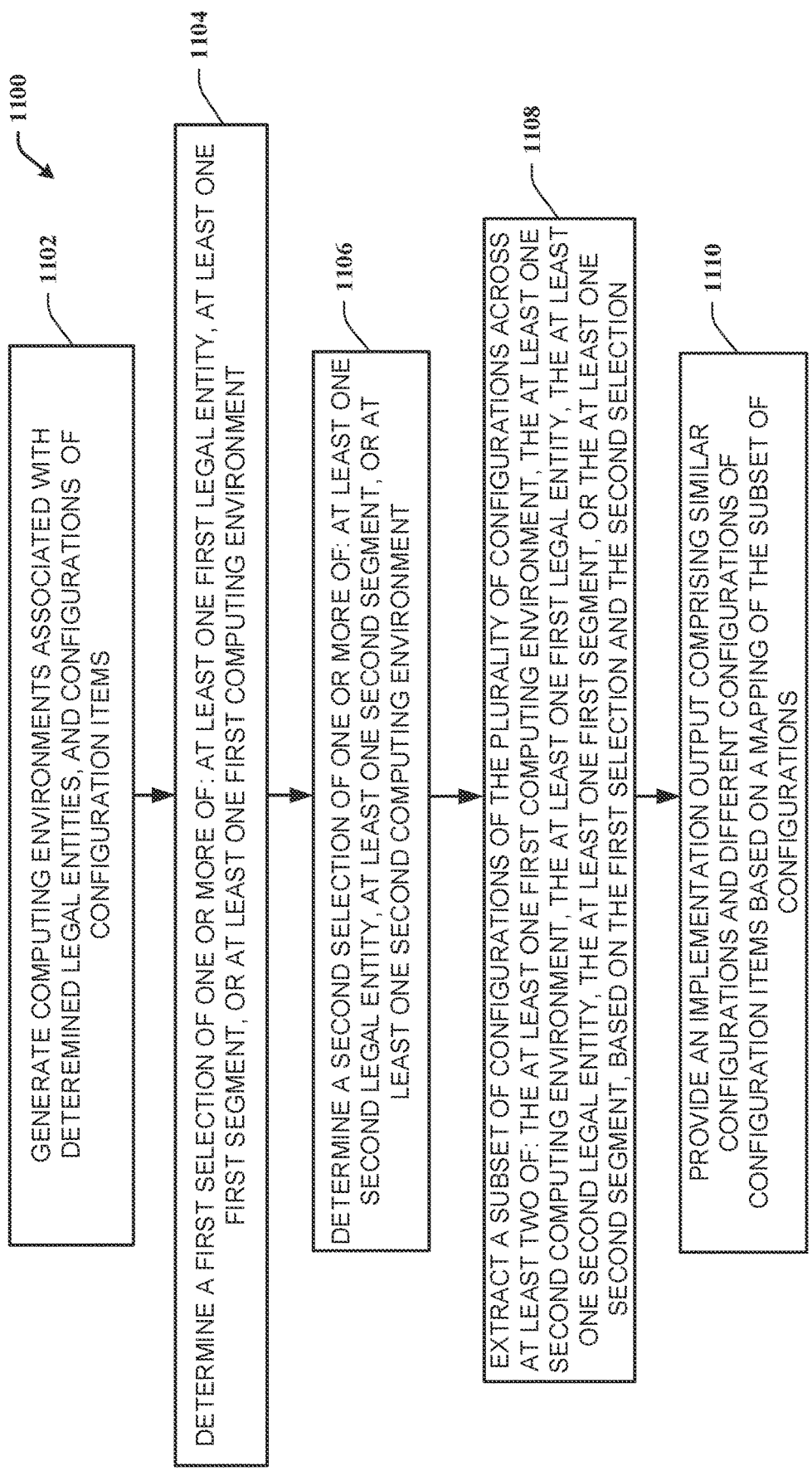
FIG. 11 illustrates another example of a process flow for an ERP configuration manager component in accordance with various aspects described herein.

Referring to FIG. 11, illustrated is another example process flow 1100 for an ERP configuration manager in accord with various aspects herein. At 1102, the process flow 1100 includes generating a plurality of computing environments associated with the plurality of legal entities, and a plurality of configurations of a plurality of configuration items associated with application module components. The plurality of configurations configure the application module components to perform business-related functions within a plurality of segments among divisions of business-related activities in an ERP application.

At 1104, the process flow 1100 further includes determining a first selection of one or more of: at least one first legal entity of the plurality of legal entities, at least one first segment of the plurality of segments, or at least one first computing environment of the plurality of computing environments.

At 1106, the process flow 1100 further includes determining a second selection of one or more of: at least one second legal entity of the plurality of legal entities, at least one second segment of the plurality of segments, or at least one second computing environment of the plurality of computing environments.

At 1108, the process flow 1100 extracting a subset of configurations of the plurality of configurations across at least two of: the at least one first computing environment, the at least one second computing environment, the at least one first legal entity, the at least one second legal entity, the at least one first segment, or the at least one second segment, based on the first selection and the second selection.

At 1110, the process flow 1100 includes providing an implementation output comprising similar configurations and different configurations of configuration items based on a mapping of the subset of configurations.

One of ordinary skill in the art can appreciate that the various non-limiting aspects of the shared systems and methods described herein can be implemented in connection with any computer or other client or server device, which can be deployed as part of a computer network, in a distributed computing environment, as a cloudless or cloud-based system, and can be connected to any kind of data store or server. In this regard, the various non-limiting aspects described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the aspects related to the ERP configuration manager as described for various non-limiting aspects of the subject disclosure.

Figure 12:
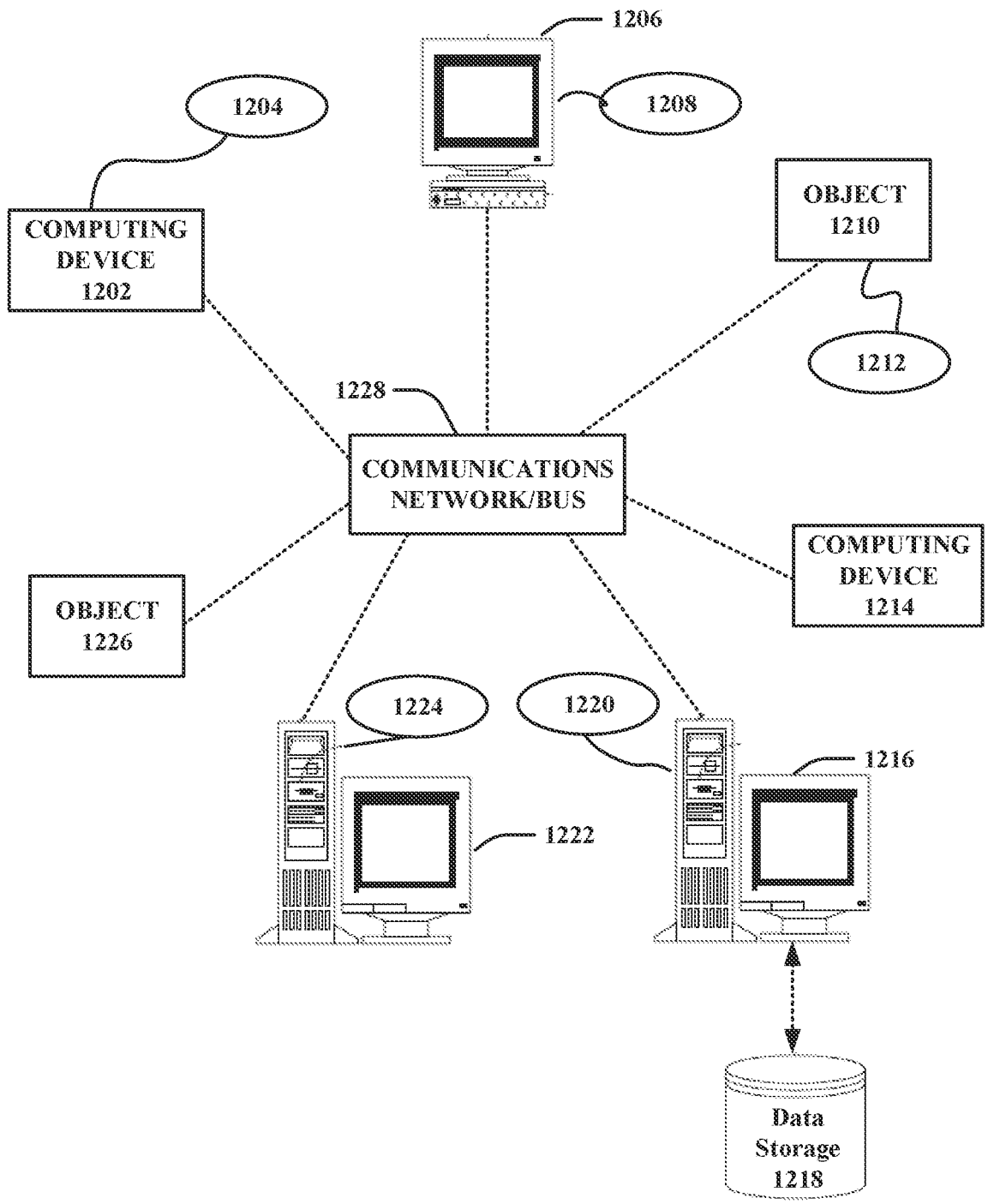
FIG. 12 is a block diagram representing exemplary non-limiting networked environments in which various non-limiting aspects described herein can be implemented.

FIG. 12 provides a schematic diagram of an exemplary networked or distributed computing environment. The distributed computing environment comprises computing objects 1210, 1226, and computing devices 1202, 1206, 1214, which may include programs, module components, methods, data stores, or programmable logic, as represented by applications 1204, 1208, 1212, 1220, or 1224. It can be appreciated that computing objects 1210, 1226, etc., or computing devices 1202, 1206, 1214, may comprise different devices, such as personal digital assistants (PDAs), audio/video devices, mobile phones, MP3 players, personal computers, laptops, etc.

Each computing object 1210, 1226, or devices 1202, 1206, 1214 can communicate with one or more other computing objects 1210, 1226, or devices 1202, 1206, 1214 by way of the communications network/bus 1228, either directly or indirectly. Even though illustrated as a single element in FIG. 12, communications network 1228 may comprise other components, computing objects and computing devices that provide services to the system of FIG. 12, or may represent multiple interconnected networks, which are not shown, as either cloud-based networks or cloudless networks. Each computing object 1210, 1226 or device 1202, 1206, 1214 can also contain an application, such as applications 1204, 1208, 1212, 1220, 1224, that could make use of an application program interface (API), or other object, software, firmware or hardware, suitable for communication with or implementation of the aspects related to the ERP configuration manager provided in accordance with various non-limiting aspects of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the aspects related to the ERP configuration manager as described in various non-limiting aspects.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server or cloud. In the illustration of FIG. 12, as a non-limiting example, computing devices 1216, 1220, 1222, 1224, can be thought of as clients and computing objects 1210, 1226 can be configured as servers where computing objects 1210, 1226 acting as servers provide data services, such as receiving data from client computing devices 1216, 1220, 1222, 1224 storing of data, processing of data, transmitting data to client computing objects or devices, although any computer can be considered a client, a server, or both, depending on the circumstances. Any of these computing devices may be processing data, or requesting services or tasks that may implicate aspects related to the ERP configuration manager as described herein for one or more non-limiting aspects.

A server is typically a remote computer system accessible over a remote or local network, such as a cloud, storage, and the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1228 or bus is the Internet, for example, the computing objects 1210, 1226 can be Web servers with which other computing objects or devices communicate via any of a number of known protocols, such as the hypertext transfer protocol (HTTP), or the like. Computing objects 1210, 1212, etc. acting as servers may also serve as clients, e.g., computing objects or devices as may be characteristic of a distributed computing environment.

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting aspects, i.e., anywhere that a device may wish to engage on behalf of a user or set of users. Accordingly, the below general purpose remote computer described below in FIG. 13 is but one example of a computing device.

Although not required, non-limiting aspects can partly be implemented via an operating system, for use by a developer of services for a device or object, and/or included within application software that operates to perform one or more functional aspects of the various non-limiting aspects described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 13:
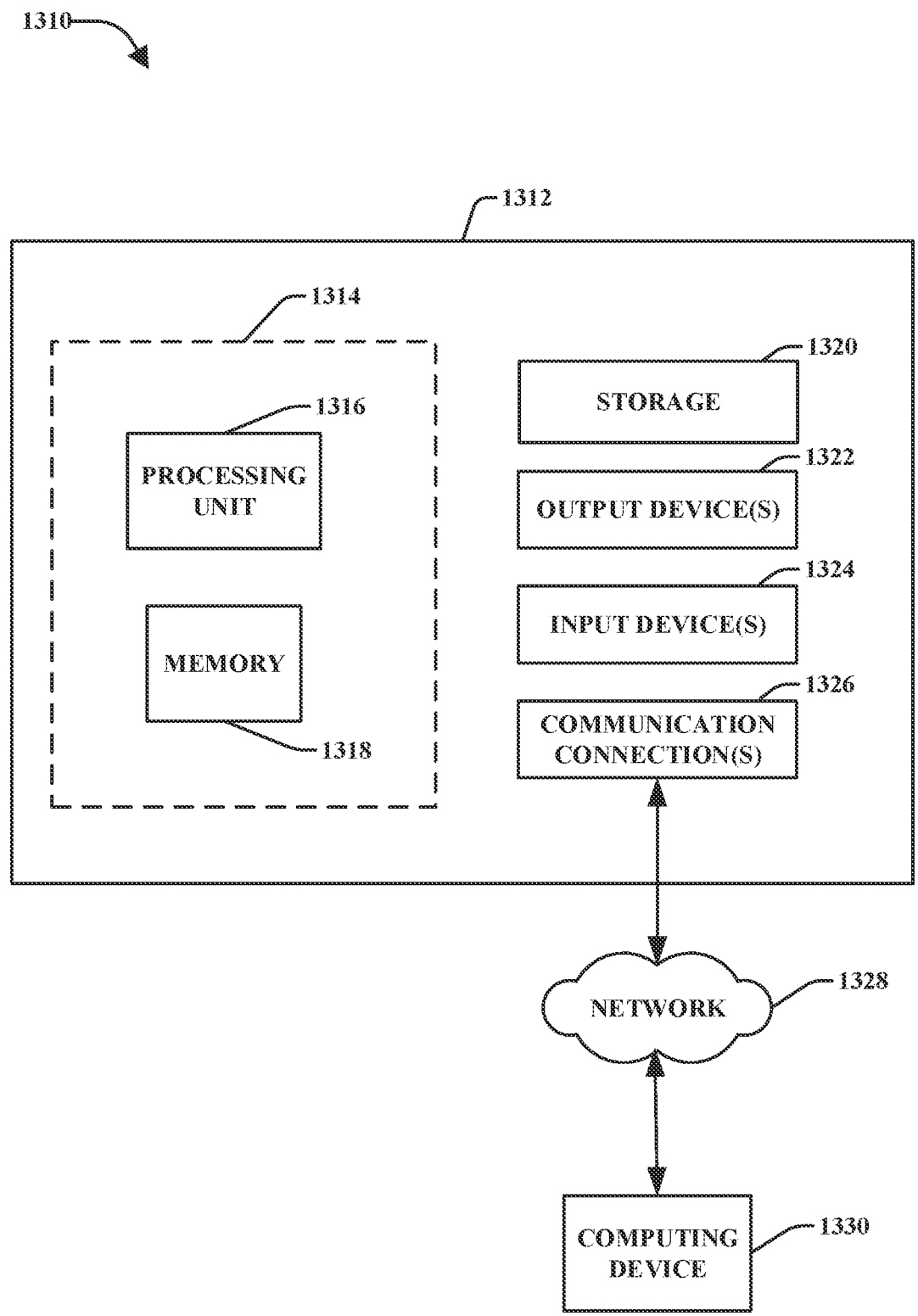
FIG. 13 is a block diagram representing an exemplary non-limiting computing system or operating environment in which one or more aspects of various non-limiting aspects described herein can be implemented.

FIG. 13 and the following discussion provide a brief, general description of a suitable computing environment to implement aspects of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like. The aspects described herein can also be configured through a severless computing environment, in which a cloud service provider can operate to provision, scale, or manage the infrastructure or components being utilized to execute computer readable instructions associated with the different aspects or embodiments herein, such as via network 1328, for example.

Although not required, aspects are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1300 comprising a computing device 1312 configured to implement one or more aspects provided herein. In one configuration, computing device 1312 includes at least one processing unit 1316 and memory 1318. Depending on the exact configuration and type of computing device, memory 1318 may be volatile (such as RAM, for example), non-volatile (such as ROM, flash memory, etc., for example) or some combination of the two. This configuration is illustrated in FIG. 13 by dashed line 1314, which can comprise a system on a chip, processing circuitry, or other component(s) as described herein.

In other aspects, device 1312 may include additional features and/or functionality. For example, device 1312 may also include additional storage (e.g., removable or non-removable) including, but not limited to, magnetic storage, optical storage, and the like, as illustrated by storage 1320. In one aspect, computer readable instructions to implement one or more aspects provided herein by execution of the instructions can be stored in storage 1320. Storage 1320 may also store other computer readable instructions to implement an operating system, an application program, application modules in computing environments and the like. Computer readable instructions may be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" as used herein includes computer readable storage media and communication media. Computer readable storage media includes volatile and nonvolatile, removable and non-removable media implemented in any method or technology for storage of information such as computer readable instructions or other data. Memory 1318 and storage 1320 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer readable storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 1312 may include input device(s) 1324 such as keyboard, mouse, pen, voice input device, touch input device, infrared cameras, video input devices, and/or any other input device. Output device(s) 1322 such as one or more displays, speakers, printers, and/or any other output device may also be included in device 1312. Input device(s) 1324 and output device(s) 1322 may be connected to device 1312 via a wired connection, wireless connection, or any combination thereof. In one aspect, an input device or an output device from another computing device may be used as input device(s) 1324 or output device(s) 1322 for computing device 1312.

Components of computing device 1312 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another aspect, components of computing device 1312 may be interconnected by a network. For example, memory 1318 may be comprised of multiple physical memory units located in different physical locations interconnected by a network 1328 or via a cloud-based system of one or more servers.

Those skilled in the art will realize that storage devices utilized to store computer readable instructions may be distributed across a cloud, or network 1328. For example, a computing device 1330 accessible via network 1328 may store computer readable instructions to implement one or more aspects provided herein. Computing device 1312 may access computing device 1330 and download a part or all of the computer readable instructions for execution. Alternatively, computing device 1312 may download pieces of the computer readable instructions, as needed, or some instructions may be executed at computing device 1312 and some at computing device 1330.

Various operations of aspects are provided herein. In one aspect, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each aspect or embodiment provided herein for sake of brevity of description, but not necessarily limited by any such aspect or example.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., applications, elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A non-transitory computer readable storage storing computer executable instructions that, in response to execution, cause a processor of a computing system to perform operations, the operations comprising:
receiving, via a first computing device, in an enterprise resource planning (ERP) application selections of: a first legal entity from among a plurality of legal entities within an organization, a segment from among a plurality of segments within the first legal entity, and a first computing environment of a second computing device from among different computing environments of different computing devices within the organization, wherein the segment is a business-related segment associated with business-related processes that differ from that of other segments in the plurality of segments within the first legal entity of the organization, wherein the plurality of segments comprises different business-related segments associated with different business-related processes, respectively;
receiving, via a server, ERP data of the second computing device that is associated with the segment, the first legal entity and the first computing environment of the second computing device;
identifying, via the first computing device, configuration items of the ERP application from the second computer device that are associated with the first legal entity and the segment within the first legal entity, based on the ERP data, wherein the configuration items configure application module components of the ERP application differently from among the plurality of legal entities within the segment and the different computing environments of the different computing devices;
determining, from the ERP data of the second computing device, configurations of the configuration items in the application module components, respectively;
receiving, via the first computing device, selections of: a second computing environment of a third computing device, another segment from among the plurality of segments, and a second legal entity from among the plurality of legal entities within the organization, wherein the another segment comprises a different business-related segment within at least one of: the first legal entity or the second legal entity;
analyzing, via the first computing device, the configuration items of the application module components across: the segment and the another segment selected, the first computing environment and the second computing environment selected, and the first legal entity and the second legal entity selected;
providing to the server, or an output device, a communication of results in an implementation output, based on the analyzing, to update, restore or maintain at least one of the different computing environments in at least one of the different computing devices with executable instructions according to the implementation output; and
deploying, via a network by the server, the executable instructions to the at least one of the different computing environments, wherein the executable instructions are executed by the at least one of the different computing devices and update, restore or maintain the configuration items of the at least one of the different computing devices.

2. The non-transitory computer readable storage of claim 1, the operations further comprising:
configuring a known state of the computing environment comprising the configurations of the configuration items based on the segment of the plurality of segments, or the another segment, and the first legal entity, wherein the known state of the computing environment is configured for deploying the ERP application in a phase of implementation of the ERP application.

3. The non-transitory computer readable storage of claim 1, the operations further comprising:
providing similarities and differences in the communication of results for the implementation output, wherein the implementation output includes an identification of a number of identical configurations of the configuration items and a number of different configurations of the configuration items across the first legal entity and the second legal entity based on the selections received and a known state of the first computing environment.

4. The non-transitory computer readable storage of claim 3, the operations further comprising:
identifying types of issues associated with the configurations of the configuration items between the different computing environments for the plurality of legal entities, wherein the types of issues comprise one or more of: an upgraded version of one of the different computing environments, a bad entity, or an entity not configured with respect to a configuration item; and
providing the implementation output with the types of issues to one or more of the different computing environments via the server or a cloud-based application of the server.

5. The non-transitory computer readable storage of claim 4, wherein the implementation output comprises a difference summary with a subset of the configurations with the number of different configurations that are configured between the at least two of: the different computing environments, the plurality of legal entities, or the plurality of segments based on a configuration item.

6. The non-transitory computer readable storage of claim 5, the operations further comprising:
restoring at least one configuration of the subset of the configurations to the known state of at least one of the different computing environments based on the difference summary.

7. The non-transitory computer readable storage of claim 5, the operations further comprising:
updating the known state of a computing environment associated with the configuration item based on business-related feedback resulting from an execution of at least one of the different computing environments with the ERP application.

8. The non-transitory computer readable storage of claim 1, the operations further comprising:
mapping the segment of the plurality of segments, the application module components, and the configuration items in a hierarchy at each of the different computing environments and the plurality of legal entities, wherein the different computing environments are configured to execute the application module components within the segment across the plurality of legal entities based on the mapping.

9. A networked computing system, comprising:
a server comprising a data store that includes an enterprise resource planning (ERP) application;
a first computing device within an organization coupled to the server, and comprising a memory that stores computer-executable instructions and one or more processors, the organization comprising a plurality of legal entities comprising business entities, respectively, within the organization, wherein the business entities each comprises a plurality of segments associated with business-related processes that differ from among the plurality of segments;
a second computing device within the organization comprising a first computing environment of the ERP application and communicatively coupled to the first computing device and the server; and
a third computing device within the organization comprising a second computing environment of the ERP application and communicatively coupled to the first computing device and the server;
the one or more processors of the first computing device, communicatively coupled to the memory, configured to execute the computer-executable instructions to:
receive, via the first computing device, in the ERP application, selections of: a first legal entity from among the plurality of legal entities within the organization, a segment from among the plurality of segments within the first legal entity, and a first computing environment of the second computing device from among different computing environments of different computing devices within the organization, wherein the segment is a business-related segment associated that differ in business-related processes from that of other segments in the plurality of segments within the first legal entity of the organization;
receive, via the server, ERP data of the second computing device that is associated with each of the segment, the first legal entity and the first computing environment of the second computing device;
identify, via the first computer device, configuration items of the ERP application from the second computer device that are associated with the first legal entity and the segment within the first legal entity, based on the ERP data, wherein the configuration items configure application module components of the ERP application differently from among the plurality of legal entities within the segment and the different computing environments of the different computing devices, wherein the application module components of the ERP application perform the business-related processes of the segment;
determine, from the ERP data of the second computing device, configurations of the configuration items in the application module components;
receive, via the first computing device, selections of: a second computing environment of the third computing device, another segment from among the plurality of segments, and a second legal entity from among the plurality of legal entities within the organization, wherein the another segment comprises a different business-related segment with different business-related processes than the segment;
analyze, via the first computing device, the configuration items of application module components between the segment and the another segment, the first computing environment of the second computing device and the second computing environment of the third computing device, and the first legal entity and the second legal entity;
provide to the server, or an output device, a communication of results in an implementation output, based on the analyzing, to update, restore or maintain at least one of the different computing environments in at least one of the different computing devices with executable instructions according to the implementation output; and
deploy, via a network by the server, the executable instructions to the at least one of the different computing environments, wherein the executable instructions are executed by the at least one of the different computing devices and update, restore or maintain the configuration items of the at least one of the different computing devices.

10. The networked computing system of claim 9, wherein the implementation output identifies similar configurations and different configurations in the application module components based on the selections and a known state of a computing environment.

11. The networked computing system of claim 9, wherein the one or more processors are further configured to:
modify a configuration of the configuration items for the application module components to function differently at one or more of the different computing environments in a legal entity or different legal entities, based on the implementation output and business-related feedback.

12. The networked computing system of claim 9, wherein the different computing environments comprise different versions of a known state of a computing environment for developing or testing the application module components in each of the plurality of legal entities, wherein the one or more processors are further configured to:
generate a master list of the configuration items in the different computing environments for the known state of the computing environment; and
update the master list periodically by removing, adding, or updating one or more configuration items of the configuration items in the different computing environments to be configured into the ERP application.

13. A computer device, comprising:
a memory that stores computer-executable instructions;
one or more processors, communicatively coupled to the memory;
an input coupled to the one or more processors;
an output coupled to the one or more processors; and
a network interface comprising a connection to a first computing device and a second computing device with computing environments of an enterprise resource planning (ERP) application, respectively, for an organization;
wherein the one or more processors are configured to execute the computer-executable instructions to:
receive, via the input, selections in the ERP application, the selections comprising: a first legal entity from among a plurality of legal entities within the organization, a segment from among a plurality of segments that are within the first legal entity, and a first computing environment of the first computing device from among different computing environments of different computing devices within the organization, wherein the segment is a business-related segment associated with business-related processes that differ from that of other segments in the plurality of segments within the first legal entity of the organization, wherein the plurality of segments comprises different business-related segments associated with different business-related processes, respectively;

receive, via the first computing device and the second computing device, ERP data of the first computing device that is associated with the segment, the first legal entity and the computing environment of the second computing device;

identify, via the one or more processors, configuration items of the ERP application from the first computer device that are associated with the first legal entity and the segment within the first legal entity, based on the ERP data, wherein the configuration items configure application module components of the ERP application differently from among the plurality of legal entities within the segment and the different computing environments of the different computing devices;

determine, from the ERP data of the first computing device, configurations of the configuration items that configure the application module components in the ERP application across the plurality of legal entities and the different computing environments within the plurality of segments;

receive, via the input, selections of: a second computing environment of the second computing device, another segment from among the plurality of segments, and a second legal entity from among the plurality of legal entities;

analyze, via the one or more processors, the configuration items of application module components between: the segment and the another segment, the first computing environment and the second computing environment, and the first legal entity and the second legal entity;

generate a communication of results in an implementation output, based on the analyzing, to update, restore or maintain at least one of the different computing environments in at least one of the different computing devices with executable instructions according to the implementation output; and deploy, via a network by the server, the executable instructions to the at least one of the different computing environments, wherein the executable instructions are executed by the at least one of the different computing devices and update, restore or maintain the configuration items of the at least one of the different computing devices.

14. The computer device of claim 13, wherein the implementation output identifies similar configurations and different configurations in the application module components based on selections and a known state of a computing environment.

15. The computer device of claim 13, wherein the one or more processors are further configured to:
modify a configuration of the configuration items for the application module components to function differently at one or more of the different computing environments in a legal entity or different legal entities, based on the implementation output and business-related feedback.

16. The computer device of claim 13, wherein the different computing environments comprise different versions of a known state of a computing environment for developing or testing the application module components in each of the plurality of legal entities.

17. The computer device of claim 16, wherein the one or more processors are further configured to:
generate a master list of the configuration items in the different computing environments for the known state of the computing environment.

18. The computer device of claim 17, wherein the one or more processors are further configured to:
update the master list periodically by removing, adding, or updating one or more configuration items of the configuration items in the different computing environments to be configured into the ERP application.

19. The computer device of claim 13, wherein the one or more processors are further configured to:
provide similarities and differences in the communication of results for the implementation output, wherein the implementation output includes an identification of a number of identical configurations of the configuration items and a number of different configurations of the configuration items across the one or more legal entities based on the selections and a known state of a computing environment.

20. The computer device of claim 19, wherein the one or more processors are further configured to:
identify types of issues associated with the configurations of the configuration items between the different computing environments for the plurality of legal entities, wherein the types of issues comprise one or more of: an upgraded version of one of the different computing environments, a bad entity, or an entity not configured with respect to a configuration item, wherein the types of issues are identified from among the different computing environments; and
providing the implementation output with the types of issues to one or more of the different computing environments via a network server or a cloud-based application.

* * * * *